US012809668B2

(12) United States Patent
Cardona et al.

(10) Patent No.: US 12,809,668 B2
(45) Date of Patent: Nov. 24, 2026

(54) CENTRAL PROCESSING UNIT PARTITION DIAGNOSIS

(71) Applicant: Microsoft Technology Licensing, LLC, Redmond, WA (US)

(72) Inventors: Omar Cardona, Bellevue, WA (US); Matthew Woolman, Seattle, WA (US); Giovanni Pittalis, Seattle, WA (US); Dmitry Malloy, Redmond, WA (US); Christopher Peter Kleynhans, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 551 days.

(21) Appl. No.: 17/936,472

(22) Filed: Sep. 29, 2022

(65) Prior Publication Data

US 2024/0111573 A1 Apr. 4, 2024

(51) Int. Cl.

*G06F 16/17* (2019.01)
*G06F 9/38* (2018.01)
*G06F 9/48* (2006.01)
*G06F 9/50* (2006.01)

(52) U.S. Cl.

CPC .......... *G06F 9/4881* (2013.01); *G06F 9/3836* (2013.01); *G06F 9/5061* (2013.01)

(58) Field of Classification Search

None

See application file for complete search history.

(56) References Cited

U.S. PATENT DOCUMENTS 5,506,987 A * 4/1996 Abramson ............ G06F 9/5033 718/103
2004/0049621 A1* 3/2004 Singh .................... G06F 9/4812 710/260
2005/0022186 A1 1/2005 Accapadi et al.
2008/0052716 A1 2/2008 Theurer
2008/0244568 A1* 10/2008 Flemming ........... G06F 9/45541 718/1
2013/0235992 A1* 9/2013 Dawson .................. G06F 9/548 379/201.02

(Continued)

OTHER PUBLICATIONS

International Search Report and Written Opinion received for PCT Application No. PCT/US2023/030993, Dec. 18, 2023, 13 pages.

*Primary Examiner* — Mustafa A Amin

(57) ABSTRACT

Systems and methods for providing cross-partition preemption analysis and prevention. Computing devices typically include a main central processing unit (CPU) with multiple cores to execute instructions independently, cooperatively, or in other suitable manners. In some examples, one or more cores are partitioned and dedicated to a particular application, where exclusive access of the cores in the partition is intended for running processes of the application. In some examples, some "noise" can be introduced in a partition, where preemptions associated with other processes can interrupt execution of the particular application. A preemption diagnostics system and method identify and prevent sources of cross-partition preemption events from running in a dedicated CPU partition. Thus, the particular application has dedicated use of the cores in the partition. As a result, latency of the application is reduced and bounded latency corresponding to a service level agreement can be achieved.

20 Claims, 7 Drawing Sheets

(56) References Cited

U.S. PATENT DOCUMENTS

| | | | | |
|---|---|---|---|---|
| 2013/0312006 | A1* | 11/2013 | Hardman | G06F 9/5027<br>718/105 |
| 2016/0196164 | A1 | 7/2016 | Lin et al. | |
| 2017/0109080 | A1* | 4/2017 | Liu | G06F 12/109 |
| 2017/0361870 | A1* | 12/2017 | Naganathan | G06F 11/3419 |
| 2021/0240542 | A1* | 8/2021 | Nguyen | G06F 9/5083 |

* cited by examiner

MOBILE COMPUTING DEVICE

CENTRAL PROCESSING UNIT PARTITION DIAGNOSIS

BACKGROUND

One challenge for improving performance of an application process is to minimize preemptions of the application process while running. For instance, when a thread runs to the end of its quantum and does not yield, the thread is preempted or another thread is scheduled to run. Thus, when a particular application process is preempted by a thread of another application process, the amount of time to complete the particular application process can increase, which can introduce or increase latency.

In some examples, an application process can be hard-affinitized to one or more cores of a central processing unit (CPU) so that the process's threads execute only on a designated set of cores. For instance, it may be desirable to run an application process that requires a large amount of processing power on a partitioned set of dedicated cores, where the set of cores is focused on handling the tasks of the application process. Accordingly, being able to partition and dedicate one or more cores of a host computing device to executing a particular application process is desirable for increasing application performance.

In some examples, a set of cores that are dedicated to a particular application process is preempted to run a thread of another application process. The preemption, for example, can be caused by affinitization configurations made prior to partitioning of the set of cores. For example, another application process that is affinitized, bound, or otherwise mapped to the dedicated cores can preempt the particular application process and cause/increase latency.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for providing cross-CPU partition preemption identification and removal. Examples of the present disclosure address various aspects of the foregoing challenge by implementing diagnosis of preemption events on a CPU having multiple cores. A preemption diagnostics system and method identify and remove cross-partition preemption events from a CPU partition such that the cores included in the CPU partition are dedicated to executing threads of a particular application process. As a result, bounded latency associated with running the application process can be achieved.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

Examples described in this disclosure relate to systems and methods for identifying and removing latency-inducing preemptions from a central processing unit (CPU) partition. A computing device typically includes a main CPU with multiple cores to execute instructions independently, cooperatively, or in other suitable manners. In some examples, a set of one or more cores are partitioned and dedicated to a particular application, where exclusive access of the set of cores in the partition is intended for running processes of the application. In some examples, some "noise" can be introduced in a CPU partition, where preemptions associated with cross-CPU partition processes can interrupt execution of the particular application. A preemption diagnostics system and method identify, reduce, remove, and/or otherwise limit additional latency caused by cross-partition events, such that the particular application has dedicated use of the cores in the partition. As a result, bounded latency associated with running the particular application processes can be achieved.

Figure 1:
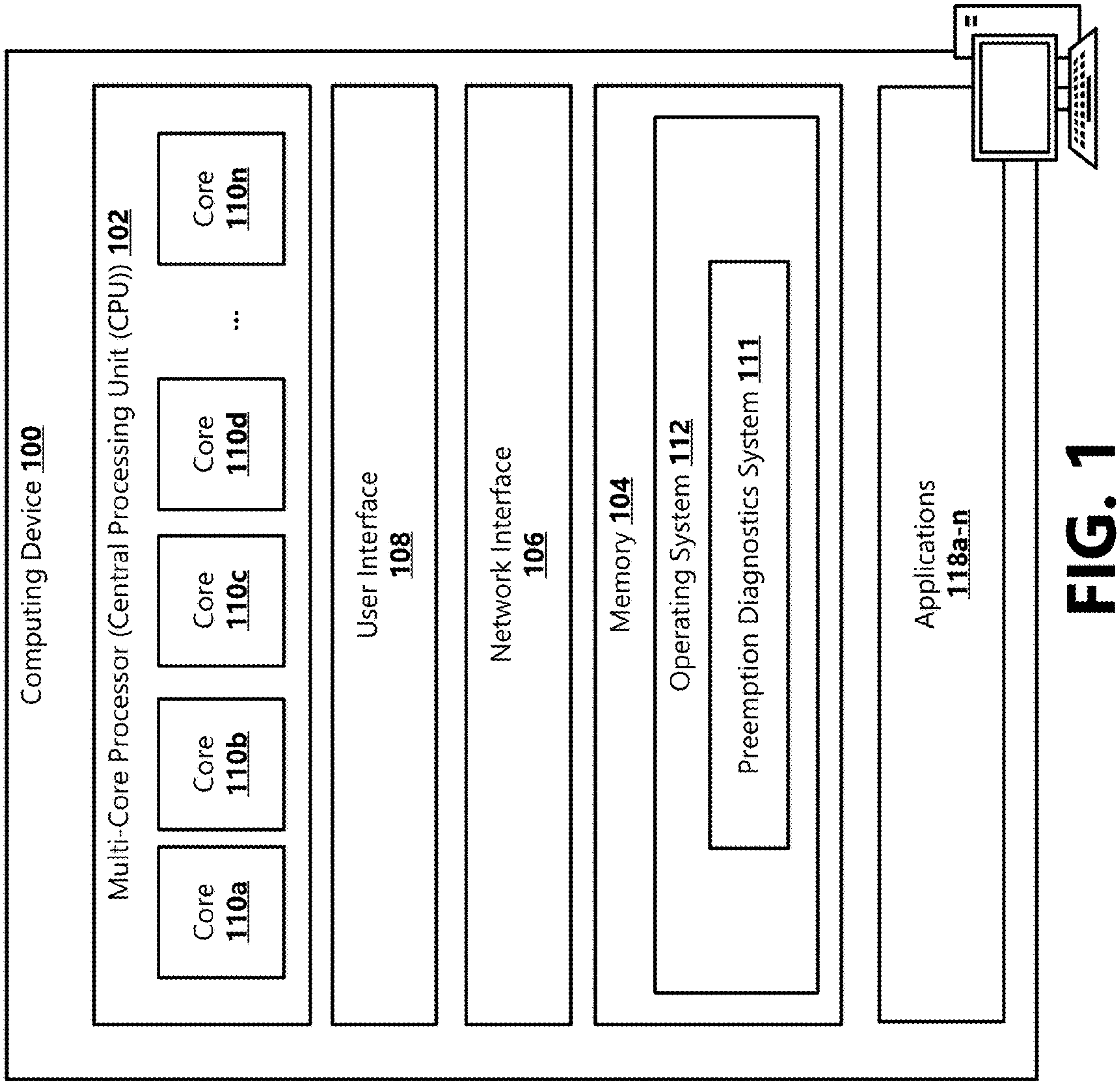
FIG. 1 is a block diagram depicting an example computing device including a preemption diagnostics system for providing cross-partition preemption identification and removal according to an example.

FIG. 1 is a block diagram of a computing device 100 that provides removal of latency-inducing preemption(s) in accordance with one example. With reference now to FIG. 1, a schematic diagram of an example computing device 100 suitable for implementing examples of the present disclosure is illustrated. In various examples, the computing device 100 is a general purpose computer, such as a desktop computer, a tablet computer, a laptop computer, a server, and so forth. However, in other examples, the computing device 100 is a smart phone, a game console, a wearable, or any other electronic device that is equipped with a multi-core CPU, herein referred to as a multi-core processor 102. The multi-core processor 102 is a microprocessor on a single integrated circuit with two or more separate processing units, called cores 110*a*-110*n* (collectively, cores 110), each of which reads and executes program instructions. For instance, the multi-core processor 102 includes an electrical circuit comprising discrete electronic elements, packaged or integrated electronic chips containing logic gates, a circuit utilizing a microprocessor, a single chip containing electronic elements or microprocessors, or other suitable logic devices. In some examples, threads of execution are mapped to processor cores 110, or moved between cores 110 based on aspects of the present disclosure. The cores 110 are capable of executing threads that perform tasks of an application process. In various examples, the multi-core processor 102 includes two, four, eight, sixteen, or another suitable number of cores 210. The cores 210 can individually include one or more arithmetic logic units, floating-point units, L1 and L2 cache, and/or other suitable components.

As shown, the computing device 100 further includes a memory 104, a user interface 108, and a network interface 106 operatively coupled to one another. The memory 104 includes volatile and/or non-volatile media and/or other types of computer-readable storage media configured to store data received from, as well as instructions for, a preemption diagnostics system 111 (e.g., instructions for performing the method discussed below with reference to FIG. 4).

In some examples, the user interface 108 includes a data output device (e.g., visual display, audio speakers), and one or more data input devices. The data input devices may include combinations of one or more of keypads, keyboards, mouse devices, touch screens, microphones, speech recognition packages, gesture recognition packages, and any other suitable devices or other electronic/software selection methods.

In some examples, the network interface 106 includes wired and/or wireless communication interface components that enable the computing device 100 to transmit and receive data via a network. In various embodiments, the wireless interface component operates to communicate via cellular, WI-FI, BLUETOOTH, satellite transmissions, and/or so forth. The wired interface component may include a direct I/O interface, such as an Ethernet interface, a serial interface, a Universal Serial Bus (USB) interface, and/or so forth. For example, the computing device 100 comprises network capabilities for exchanging data with other electronic devices (e.g., laptop computers, servers, etc.) via one or more networks, such as the Internet.

According to examples, the multi-core processor 102 and the memory 104 of the computing device 100 store an operating system 112, the preemption diagnostics system 111, and applications 118*a-n* (collectively, applications 118). The operating system 112 includes components that enable the computing device 100 to receive data via various inputs (e.g., user controls, network interfaces, and/or memory devices), and process the data using the multi-core processor 102 to generate output. The operating system 112 may further include one or more components that provide the output to the user interface 108, the network interface 106, another portion of memory 104, etc. (e.g., display an image on an electronic display, store data in memory, transmit data to another electronic device).

In some examples, the operating system 112 includes other components that perform various other functions generally associated with an operating system, such as processing data for the applications 118. Various components, for example, work cooperatively to manage the threads that processes the data for the applications 118. The threads, for example, perform tasks of the applications 118. A thread, as used herein, refers to a single sequential flow of control within a program or application. In some examples, the various components include a dispatcher, a scheduler, and a queue. According to some examples, the dispatcher allocates cores 110 of the multi-core processor 102 to execute threads that perform different tasks (e.g., on a round robin basis, a fair use basis, a random order basis, or on some other basis). In some examples, the scheduler is responsible for managing the execution of threads by distributing computer resources to different threads. For instance, there can be hundreds of processes running at a same time that the multi-core processor 102 cannot handle simultaneously. Thus, the scheduler manages these processes and assigns them CPU time based on various factors. In some examples, the scheduler decides which process thread will run on which CPU core 110. According to examples, CPU affinity is a configurable setting that can force a process or thread to run on a particular core 110 or cores 110. Processes or threads that are affinitized to specific cores 110 will only run on the specified cores. For instance, the affinity table can indicate that a caller thread has an affinity for a first core 110*a* when the caller thread is allocated to execute on the first core 110*a*. In some examples, the queue stores information that indicates the affinities of the specific threads to particular cores 110.

In some examples, the applications 118 execute in a desktop environment provided by the operating system 112. The applications 118 can include processes that perform real-time tasks and/or non real-time tasks. In various examples, the applications 118 include productivity applications, gaming applications, entertainment applications, and/or communication applications. In at least one example, the applications 118 include an interface application that enables a system administrator to assign specific cores 110 of the multi-core processor 102 to execute threads that perform particular application process tasks.

In some examples, CPU partitioning is enabled, where a set of CPU cores 110 is isolated for exclusive use by the particular application 118. According to an example, when a set of cores 110 is dedicated to an application process, bounded latency is provided for the associated workload, where the application process tasks are bound to soft time limits. As can be appreciated, performance of an application 118 is improved by ensuring the set of cores 110 is dedicated to executing the particular application's tasks without preemptions (e.g., interruptions) from processes of other applications. As an example, preemptive multitasking enables a currently running task on a set of cores 110 to be interrupted and swapped out in order to start or continue running another task. Thus, CPU time is allocated to multiple application process tasks. Profile setting properties can be configured to assign an application process to use a given set of cores 110, where a violation (e.g., of a contract) occurs if another application process uses the given set of cores 110. As can be appreciated, completion time of an application process can be negatively impacted by preemptions associated with such violations.

While partitioning and dedicating one or more cores 110 to run a particular application process is intended to provide exclusive access to the one or more cores 110 for executing tasks corresponding to a particular application 118 and its preemptions, in some examples, some "noise" can be introduced in the CPU partition, where "noise" refers to preemptions associated with other application processes that interrupt execution of the particular application 118. For instance, in some cases, prior to dedicating the set of cores 110 to the particular application 118, various hardware or CPU interrupts may be distributed across various cores 110 of the multi-core processor 102. Thus, a preemption event associated with another process that was previously mapped or bound to a core 110 of the CPU partition, can interrupt processes of the particular application 118 while executing on the core 110 (e.g., although the core 110 may be dedicated to the particular application 118). Such interruptions can negatively impact completion time of the particular application 118. As an illustrative example, a CPU partition including a set of cores 110 is dedicated to running one or more processes of an application 118. In some examples, a latency bound is agreed upon (e.g., in a service level agreement (SLA)) for the CPU partition for ensuring acceptable application performance. Thus, it is desirable to identify, reduce, remove, and/or otherwise limit additional latency caused by cross-CPU partition events, such that the application 118 has dedicated use of the set of cores 110. As a result, the SLA for a bounded latency can be met.

Accordingly, a preemption diagnostics system 111 is provided to automatically identify and isolate violating preemptions from a set of cores 110 in a dedicated CPU partition. In some examples, the multi-core processor 102 communicates with the memory 104 to execute suitable instructions to provide the preemption diagnostics system 111. As shown in FIG. 1, the preemption diagnostics system 111 is included in the computing device 100 and, in some examples, operates in kernel space of the computing device's operating system 112. As described herein, the preemption diagnostics system 111 operates to execute a number of computer readable instructions, data structures, or program modules to provide partition diagnostics. The preemption diagnostics system 111 analyzes a preemption of an application process to identify a root cause (herein referred to as a source) of the preemption. The preemption diagnostics system 111 evaluates thread context information that is logged in association with the preemption and identifies whether a source of the preemption is an application 118 to which the CPU partition is dedicated or is another application process. For instance, when the source is another application process, the preemption is determined to be a violating preemption. According to an example, access to thread context information enables the preemption diagnostics system 111 to determine the sources of preemptions occurring in dedicated CPU partitions, whereas the application 118 that is preempted does not have access to the thread context information and, therefore cannot determine the sources of preemptions occurring in the dedicated CPU partition.

The preemption diagnostics system 111 is configured to evaluate information logged in association with a preemption event (i.e., an event where a task preempts another task). The preemption event log, in some examples, is created when a preemption task (e.g., task preempting another task, herein referred to as a preemption) is assigned to a queue. According to an example, the information logged includes thread context information that identifies the application process that owns the thread corresponding to the preemption. Examples of preemption events include a scheduler event, where an application process is interrupted to run a task of a higher priority; a deferred procedure call (DCP), where the process is interrupted to run a required, lower-priority task; an interrupt service routine (ISR), where the process is interrupted by an ISR that is running at a higher interrupt request level; or other suitable preemption events. In some examples, the preemption diagnostics system 111 is configured to evaluate information logged in association with a preemption event when an application process is interrupted by preemptions for a quantum that meets or exceeds a time threshold (e.g., 100 microseconds).

When a preemption is determined to be a violating preemption, and thus a source of the preemption is not associated with the application 118 to which a CPU partition is dedicated, the preemption diagnostics system 111 further moves the source of the violating preemption from the dedicated CPU partition. In some examples, the preemption diagnostics system 111 modifies one or more system configuration settings to move and bind the source of the violating preemption to another core 110 (e.g., outside the dedicated CPU partition). In some examples, the preemption diagnostics system 111 refactors code corresponding to the source of the violating preemption so that it no longer generates threads that affinitize to the dedicated partition and preempt the dedicated application 118. Thereby, CPU partition SLAs can be honored. Accordingly, latency caused by cross-CPU partition violating preemptions is reduced, removed, and/or otherwise limited. Although FIG. 1 shows the example computing device 100 as having a certain number of components arranged in a certain manner, in other examples, the computing device 100 may include additional or fewer components, arranged differently.

Figure 2:
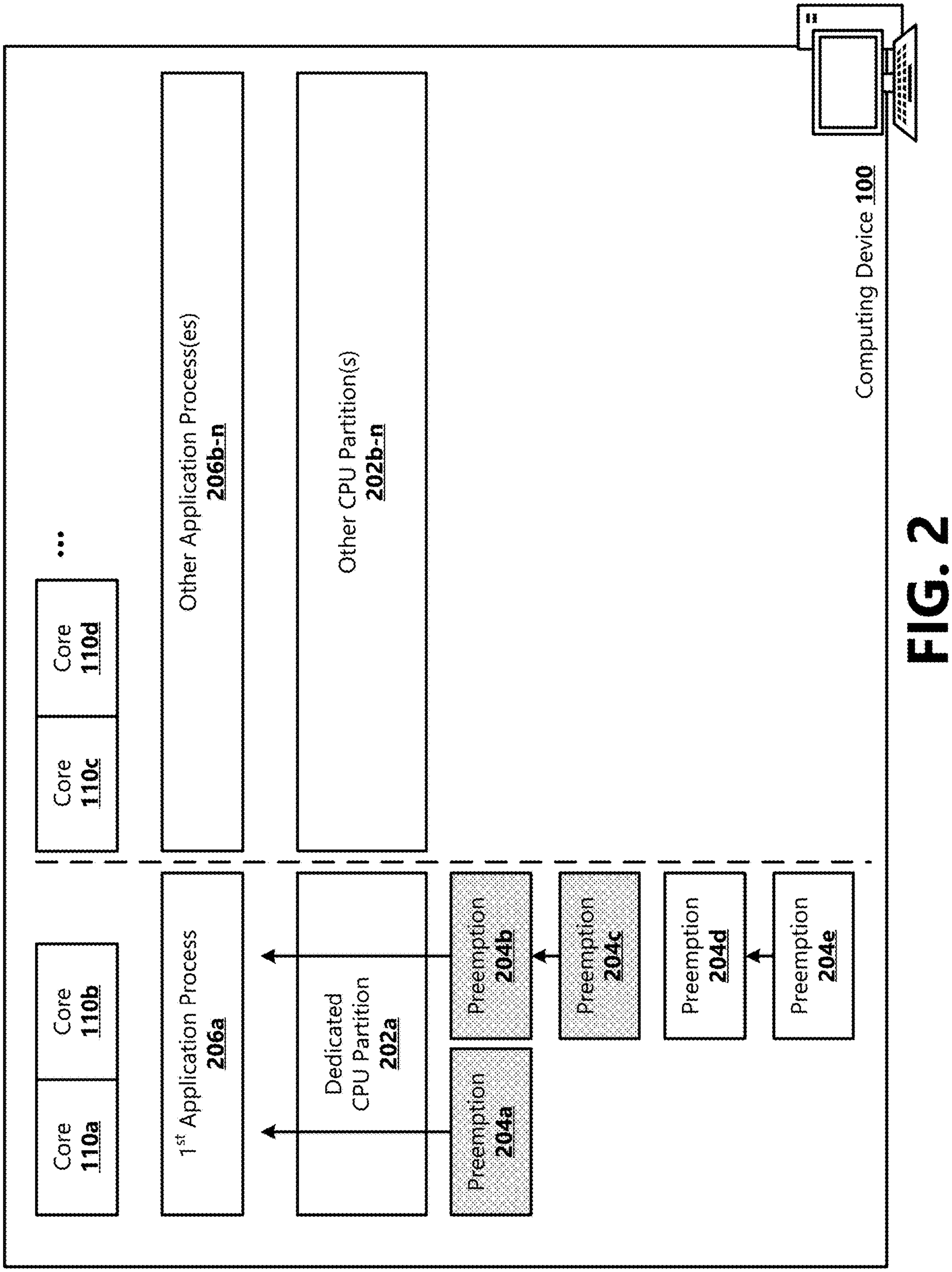
FIG. 2 is a block diagram depicting identification of cross-partition preemption events in a partition according to an example.
Figure 3:
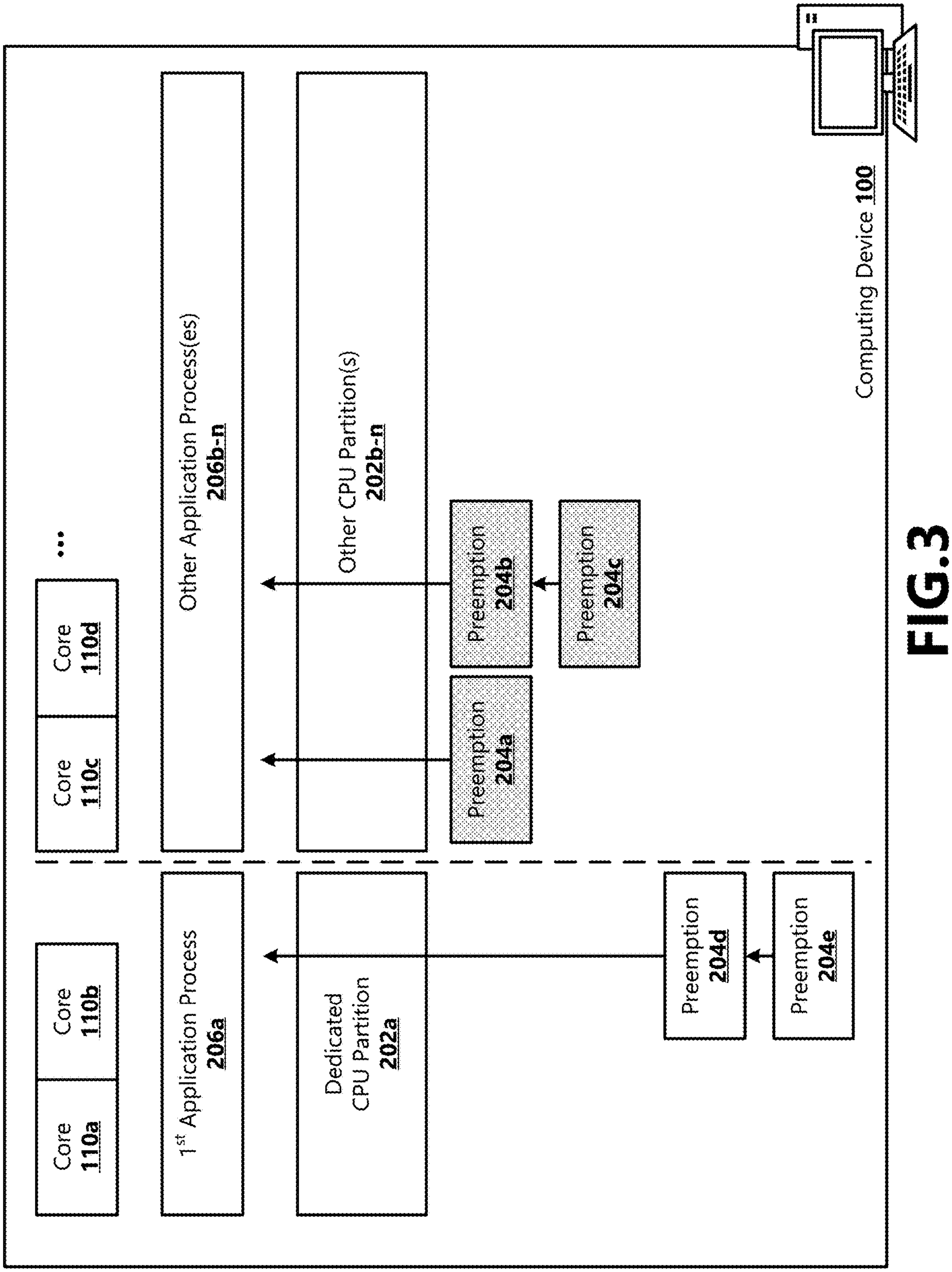
FIG. 3 is a block diagram depicting removal of the cross-partition preemption events from the partition in FIG. 2 according to an example.

FIGS. 2 and 3 depict block diagrams illustrating identification and removal of preemptions from a partition according to examples. With reference now to FIG. 2, a dedicated CPU partition 202*a* is shown configured on a computing device 100. For example, a first core 110*a* and a second core 110*b* of the computing device 100 are assigned to the dedicated CPU partition 202*a*. The dedicated CPU partition 202*a* is dedicated to running tasks of a first application process 206*a* and its corresponding preemptions. In the illustrated example, at least a third core 110*c* and a fourth core 110*d* of the computing device 100 are assigned to one or more other application processes 206*b-n* running on one or more other CPU partitions 202*b-n*. According to an example, during execution of the first application process 206*a* on the dedicated CPU partition 202*a*, a plurality of preemptions 204*a-e* (collectively, 204) interrupt execution of the first application process 206*a*. For instance, the first core 110*a* and/or second core 110*b* are interrupted from executing a task corresponding to the first application process 206*a* to execute tasks corresponding to the plurality of preemptions 204, where some of the preemptions 204 are associated with the first application process 206*a* and other preemptions 204 are violating preemptions (e.g., associated with the one or more other processes 206*b-n*). According to an example, when a preemption 204 is assigned to a queue (e.g., corresponding to the first core 110*a* or the second core 110*b*), a log of the preemption event is generated. The event log includes information about the preemption event and the source (e.g., application process 206) corresponding to the preemption 204. For instance, the preemption event logs corresponding to the plurality of preemptions 204 are provided to the preemption diagnostics system 111, which makes a determination as to whether a preemption event 204 is a violating preemption.

As an example, and as indicated by shading in FIG. 2, the preemption diagnostics system 111 evaluates the preemption event logs corresponding to the plurality of preemption events 204 and determines the source of a first preemption 204*a*, a second preemption 204*b*, and a third preemption 204*c* are associated with one or more other application processes 206*b*-206*n* that are assigned to one or more other CPU partitions 202*b*-202*n*. For instance, the first preemption 204*a* may correspond to a scheduler event, the second preemption 204*b* may correspond to a DCP event, and the third preemption 204*c* may correspond to an interrupt event associated with one or more other application processes 206*b*-206*n*. The first, second, and third preemptions 204*a*-204*c*, therefore, represent violating preemptions that can cause latency in the first application process 206*a*. Further, the preemption diagnostics system 111 determines the source of a fourth preemption 204*d* and a fifth preemption 204*e* is the first application process 206*a*, whose tasks (including its corresponding preemptions) are dedicated to be run by the set of cores 110 assigned to the dedicated CPU partition 202*a*.

Accordingly, and with reference now to FIG. 3, the preemption diagnostics system 111 takes a corrective action that causes the other application processes 206*b*-206*n* and associated preemptions to execute on a different set of cores 110 (e.g., the third core 110*c* and/or the fourth core 110*d*) outside of the dedicated CPU partition 202*a*. For instance, the preemption diagnostics system 111 modifies one or more system configuration settings (e.g., interrupt request settings, affinity settings), refactors code, or otherwise causes the sources of the first, second, and third preemptions 204*a*, 204*b*, 204*c* to no longer run on the first or second core 110*a*, 110*b*. Accordingly, the first application process 206*a* is provided with full use of the resources included in the dedicated CPU partition 202*a* without interruptions from cross-partition events. Thus, latency is reduced, which enables the first application process 206*a* to run within agreed latency bounds associated with the dedicated CPU partition 202*a*.

Figure 4:
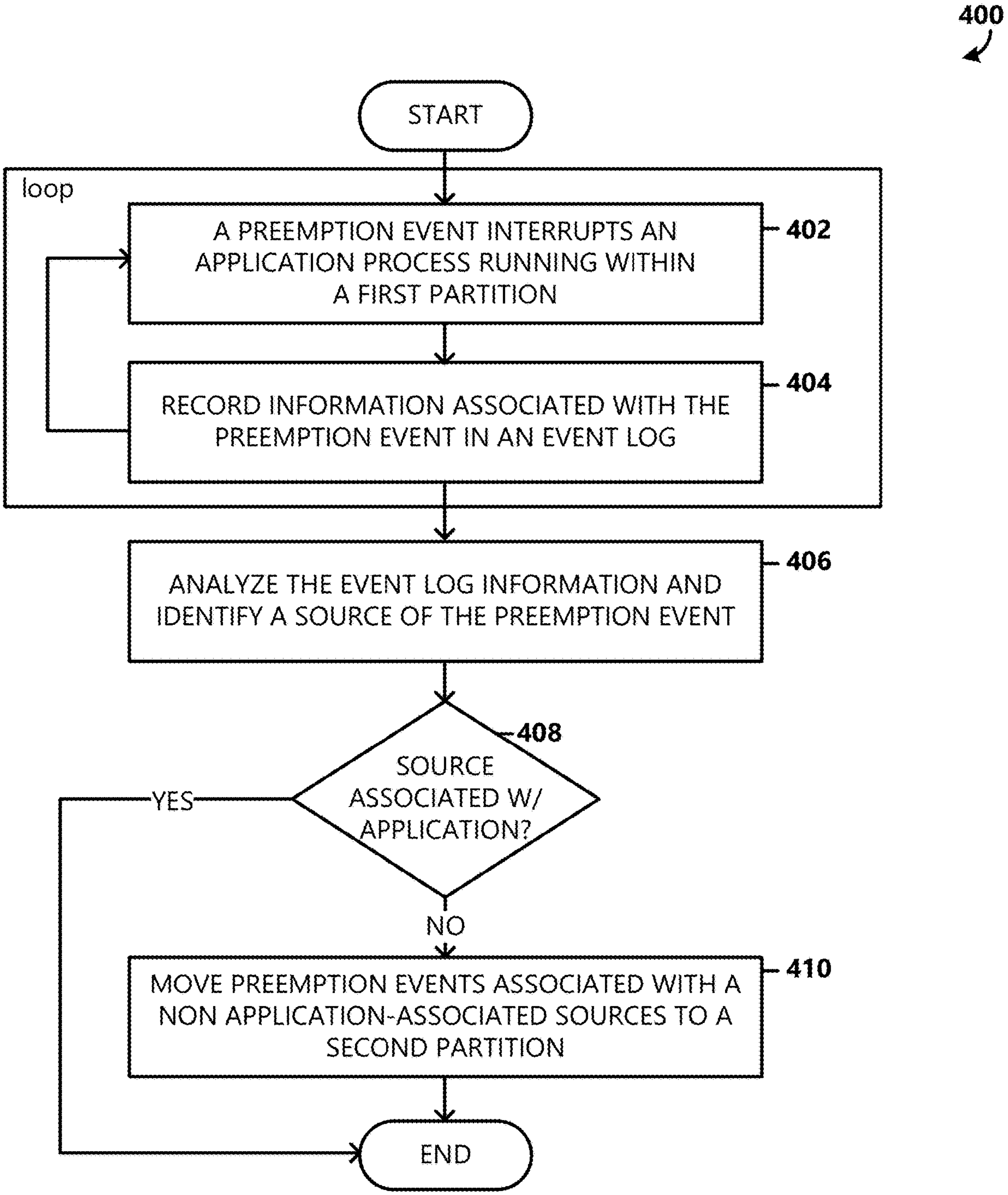
FIG. 4 is a flowchart depicting operations of an example method for performing cross-partition preemption identification and prevention.

With reference now to FIG. 4, a flowchart depicting a method 400 for providing cross-CPU partition preemption identification and removal according to an example is provided. The operations of method 400 may be performed by one or more computing devices, such as by the preemption diagnostics system 111 operating on a computing device 100, as depicted in FIG. 1. At operation 402, a preemption 204 interrupts a first application process 206*a* running within a dedicated CPU partition 202*a*. For instance, the dedicated CPU partition 202*a* includes one or more cores 110 that are dedicated to executing threads of the first application process 206*a*. In some examples, prior to partitioning the one or more cores 110 into the first CPU partition 202*a*, tasks associated with one or more other application processes 206*b*-206*n* that may run within another CPU partition 202*b*-*n* are bound to, linked, or otherwise configured to run on a core 110 included in the dedicated CPU partition 202*a*. For instance, the one or more other application processes 206*b*-206*n* have configuration settings that have at least one core 110 in the dedicated CPU partition 202*a* selected or otherwise indicated as a core on which the process(es) are allowed to execute.

At operation 404, an event log including information associated with the preemption event 204 is generated. For instance, the information recorded in the event log includes context information that identifies the application process 206 that owns the thread corresponding to the preemption 204. Operations 402 and 404 may loop during execution of the first application process 206*a*.

At operation 406, the event log is analyzed. For example, the preemption diagnostics system 111 evaluates the recorded information for determining a source of the preemption(s) 204. In some examples, an indication of a preemption 204 is received by the preemption diagnostics system 111 and the associated event log data is analyzed when the first application process 306*a* is interrupted for longer than a threshold quantum. In other examples, an indication of a preemption 204 is received in association with receiving a preemption event log.

At decision operation 408, a determination is made as to whether the determined source is the first application process 206*a* or another application process 206*b*-*n*. When a determination is made that the source of a logged preemption 204 is an application process 206*b*-*n* other than the first application process 206*a*, at operation 410, future preemptions associated with the other application process 206*b*-*n* are reassigned to another CPU partition 202*b*-*n*. Accordingly, described herein is a system for preventing a cross-CPU partition preemption, the system comprising: a processor; and memory storing instructions that, when executed by the processor, cause the system to: receive an indication of a preemption of a first application process running within a CPU partition dedicated to running the first application process; determine, based on a log event associated with the preemption, a source of the preemption is a second application process different from the first application process; determine the preemption is a violating preemption; and take a corrective action to prevent the source of the violating preemption from running in the dedicated CPU partition. For example, system configuration settings are modified, code is refactored, or other configurations are made by the preemption diagnostics system 111 to prevent the other application process 206*b*-206*n* from affinitizing to the cores 110 included in the dedicated CPU partition 202*a*. Accordingly, the first application process 206*a* is provided with full use of the resources included in the dedicated CPU partition 202*a* without interruptions from cross-partition events.

Figure 5:
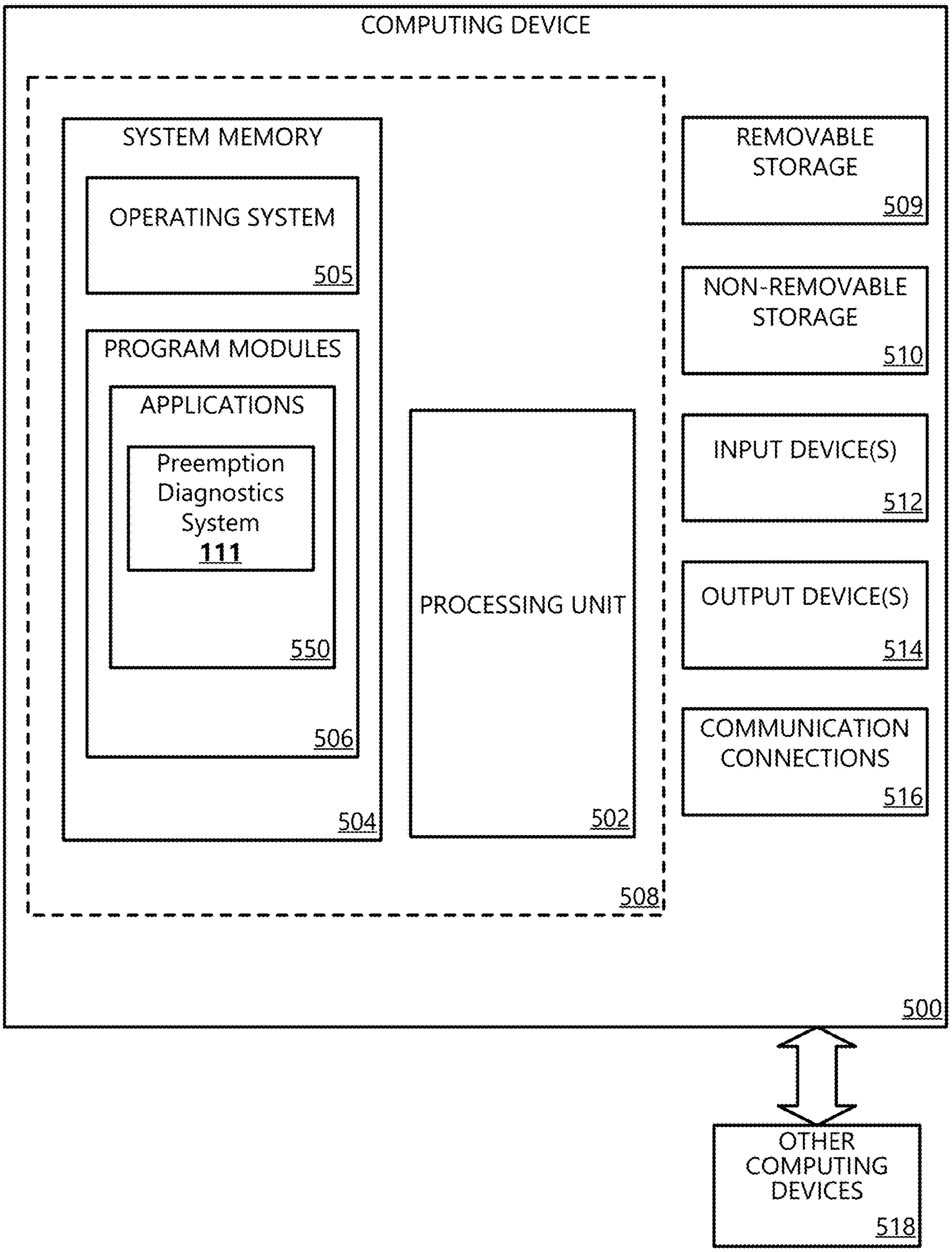
FIG. 5 is a block diagram illustrating example physical components of a computing device with which aspects of the disclosure may be practiced.
Figure 6A:
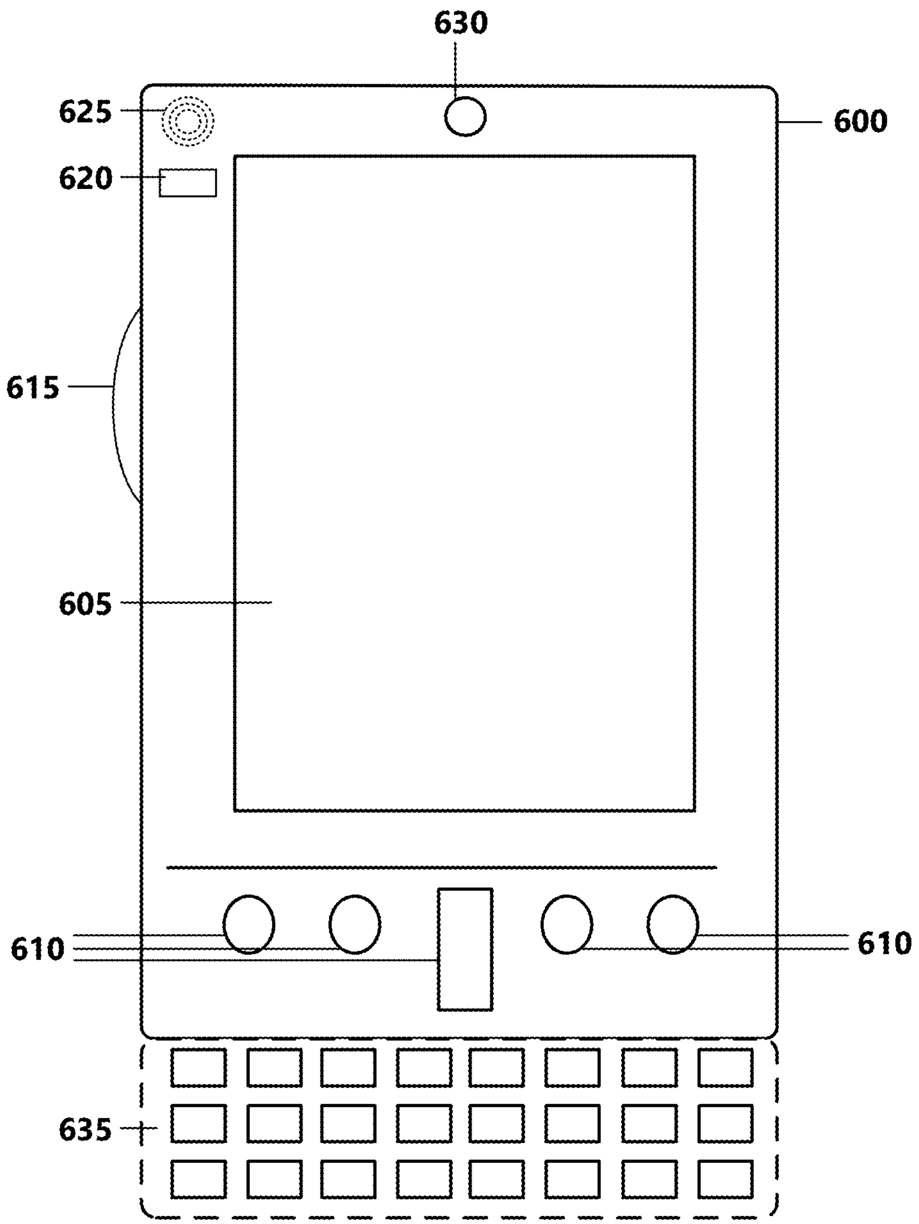
FIGS. 6A and 6B are block diagrams of a mobile computing device with which aspects of the present disclosure may be practiced.
Figure 6B:
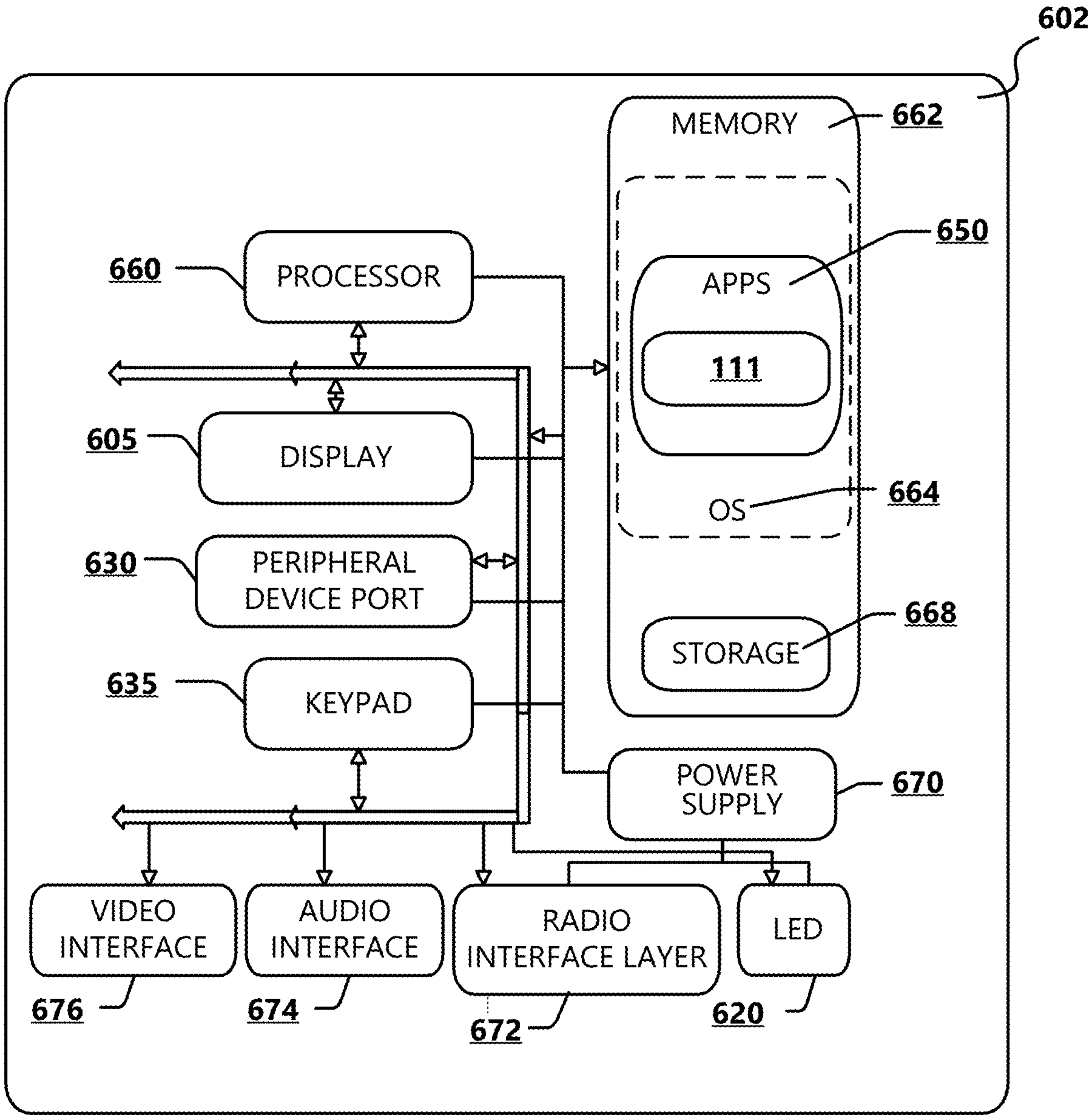

FIGS. 5, 6A, and 6B and the associated descriptions provide a discussion of a variety of operating environments in which examples of the disclosure may be practiced. However, the devices and systems illustrated and discussed with respect to FIGS. 5, 6A, and 6B are for purposes of example and illustration, a vast number of computing device configurations that may be utilized for practicing aspects of the disclosure, described herein.

FIG. 5 is a block diagram illustrating physical components (e.g., hardware) of a computing device 500 with which examples of the present disclosure may be practiced. The computing device components described below may be suitable for one or more of the components of the computing device 100 depicted above in FIG. 1. In a basic configuration, the computing device 500 includes at least one processing unit 502 and a system memory 504. Depending on the configuration and type of computing device 500, the system memory 504 may comprise volatile storage (e.g., random access memory), non-volatile storage (e.g., read-only memory), flash memory, or any combination of such memories. The system memory 504 may include an operating system 505 and one or more program modules 506 suitable for running software applications 550, such as the preemption diagnostics system 222 in one example.

The operating system 505 may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including one or more of the stages of the method 400 illustrated in FIG. 4. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing cross-CPU partition preemption identification and removal may be operated via application-specific logic integrated with other components of the computing device 500 on the single integrated circuit (chip). Examples of the present disclosure may also be practiced using other technologies capable of performing logical operations such as, for example, AND, OR, and NOT, including mechanical, optical, fluidic, and quantum technologies.

The computing device 500 may also have one or more input device(s) 512 such as a keyboard, a mouse, a pen, a sound input device, a touch input device, a camera, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 504, the removable storage device 509, and the non-removable storage device 510 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer readable media may be part of the computing device 500. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIGS. 6A and 6B illustrate a mobile computing device 600, for example, a mobile telephone, a smart phone, a tablet personal computer, a laptop computer, and the like, with which aspects of the disclosure may be practiced. With reference to FIG. 6A, an example of a mobile computing device 600 for implementing at least some aspects of the present technology is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In alternative examples, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (e.g., an architecture) 602 to implement some examples. In one example, the system 602 is implemented as a "smart phone" capable of running one or more applications (e.g., videoconference or virtual meeting application, browser, e-mail, calendaring, contact managers, messaging clients, games, and media clients/players). In some examples, the system 602 is integrated as a computing device, such as an integrated personal digital assistant (PDA) and wireless phone.

One or more application programs 650 (e.g., one or more of the components of the preemption diagnostics system 111) is loaded into the memory 662 and run on or in association with the operating system 664. Other examples of the application programs 650 include videoconference or virtual meeting programs, phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at a remote device or server. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency (RF) communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

The visual indicator 620 (e.g., light emitting diode (LED)) may be used to provide visual notifications and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of a peripheral device port 630 (e.g., an on-board camera) to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Examples include a computer-implemented method, for preventing a cross-central processing unit (CPU) partition preemption, comprising: receiving an indication of a preemption of a first application process running within a CPU partition dedicated to running the first application process; determining, based on a log event associated with the preemption, a source of the preemption is a second application process different from the first application process; determining the preemption is a violating preemption; and taking a corrective action to prevent the source of the violating preemption from running in the dedicated CPU partition Examples include a system for preventing a cross-central processing unit (CPU) partition preemption, the system comprising: a processor; and memory storing instructions that, when executed by the processor, cause the system to: receive an indication of a preemption of a first application process running within a CPU partition dedicated to running the first application process; determine, based on a log event associated with the preemption, a source of the preemption is a second application process different from the first application process; determine the preemption is a violating preemption; and take a corrective action to prevent the source of the violating preemption from running in the dedicated CPU partition.

Examples include a computer-readable medium storing instructions that, when executed by a computer, cause the computer to: receive an indication of a preemption of a first application process running within a first central processing unit (CPU) partition dedicated to running the first application process, the first CPU partition including one or more cores; generate a log event associated with the preemption; determine, based on the log event, a source of the preemption is a second application process different from the first application process; and take a corrective action to affinitize the second application process to a core outside the first CPU partition.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for preventing a cross-central processing unit (CPU) partition preemption, the system comprising:

a processor; and memory storing instructions that, when executed by the processor, cause the system to:

receive an indication of a preemption of a first application process running within a first CPU partition dedicated to running the first application process;

determine, based on a log event associated with the preemption, a source of the preemption is a second application process different from the first application process;

in response to determining the source of the preemption is the second application process, determine the preemption is a violating preemption; and in response to determining the preemption is a violating preemption, affinitize the second application process to a second CPU partition that is not dedicated to running the first application process, wherein affinitizing the second application process to the second CPU partition comprises refactoring code corresponding to the second application process such that additional preemptions associated with the second application process are assigned to the second CPU partition.

2. The system of claim 1, wherein the first CPU partition includes a first core of the processor, wherein the processor includes a plurality of cores.

3. The system of claim 1, wherein the log event comprises information identifying the second application process as the source of the violating preemption.

4. The system of claim 1, wherein prior to determining the source of the preemption, the instructions cause the system to determine the first application process is preempted for longer than a threshold quantum.

5. The system of claim 1, wherein the violating preemption is one of:

a scheduler event;

a deferred procedure call; or an interrupt service routine.

6. The system of claim 1, wherein the log event is generated in response to an assignment of the violating preemption to a queue associated with the dedicated CPU partition.

7. A computer-implemented method for preventing a cross-central processing unit (CPU) partition preemption, comprising:

receiving an indication of a preemption of a first application process running within a first CPU partition dedicated to running the first application process;

determining, based on a log event associated with the preemption, a source of the preemption is a second application process different from the first application process;

in response to determining the source of the preemption in the second application process, determining the preemption is a violating preemption; and in response to determining the preemption is a violating preemption, affinitizing the second application process to a second CPU partition that is not dedicated to running the first application process, wherein affinitizing the second application process to the second CPU partition comprises refactoring code corresponding to the second application process such that additional preemptions associated with the second application process are assigned to the second CPU partition.

8. The method of claim 7, wherein generating the log event comprises recording information identifying the second application process as the source of the violating preemption.

9. The method of claim 7, wherein determining the source of the preemption is performed in response to determining the first application process is preempted for longer than a quantum threshold.

10. The method of claim 7, wherein the violating preemption is one of:

a scheduler event;

a deferred procedure call; or an interrupt service routine.

11. The method of claim 7, wherein the log event is generated in response to an assignment of the violating preemption to a queue associated with the dedicated CPU partition.

12. The method of claim 7, wherein the first CPU partition includes a first core of the processor, wherein the processor includes a plurality of cores.

13. The method of claim 12, wherein the second CPU partition includes a second core of the processor.

14. A computer-readable media storing instructions that, when executed by a computer, cause the computer to:

receive an indication of a preemption of a first application process running within a first central processing unit (CPU) partition dedicated to running the first application process, the first CPU partition including one or more cores;

generate a log event associated with the preemption;

determine, based on the log event, a source of the preemption is a second application process different from the first application process;

in response to determining the source of the preemption in the second application process, determine the preemption is a violating preemption; and in response to determining the preemption is a violating preemption, affinitize the second application process to a second CPU partition that is not dedicated to running the first application process, wherein affinitizing the second application process to the second CPU partition comprises refactoring code corresponding to the second application process such that additional preemptions associated with the second application process are assigned to the second CPU partition.

15. The computer-readable media of claim 14, wherein prior to determining the source of the preemption, the instructions cause the computer to determine the first application process is preempted for longer than a quantum threshold.

16. The computer-readable media of claim 14, wherein the first CPU partition includes a first core of the processor, wherein the processor includes a plurality of cores.

17. The computer-readable media of claim 16, wherein the second CPU partition includes a second core of the processor.

18. The computer-readable media of claim 14, wherein the log event comprises information identifying the second application process as the source of the violating preemption.

19. The computer-readable media of claim 14, wherein the violating preemption is one of:

a scheduler event;

a deferred procedure call; or an interrupt service routine.

20. The computer-readable media of claim 14, wherein the log event is generated in response to an assignment of the violating preemption to a queue associated with the dedicated CPU partition.

* * * * *